United States Patent
Park

(10) Patent No.: US 8,351,460 B2
(45) Date of Patent: Jan. 8, 2013

(54) DIGITAL VIDEO RECORDER AND CONTROL METHOD THEREFOR

(75) Inventor: Jin Mo Park, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 1490 days.

(21) Appl. No.: 11/870,269

(22) Filed: Oct. 10, 2007

(65) Prior Publication Data

US 2008/0124044 A1    May 29, 2008

(30) Foreign Application Priority Data

Oct. 12, 2006   (KR) .................. 10-2006-0099134

(51) Int. Cl.
*H04J 3/16* (2006.01)

(52) U.S. Cl. ........ 370/466; 370/467; 370/469; 370/470; 370/471; 370/472; 370/476; 370/477; 348/142; 348/211.1; 348/211.4; 386/224; 386/226

(58) Field of Classification Search ............... 386/466, 386/467, 469–472, 476, 477, 224, 226; 348/142, 348/211.1, 211.4; 370/466, 467, 469–472, 370/476, 477
See application file for complete search history.

(56) References Cited

U.S. PATENT DOCUMENTS

| | | | |
|---|---|---|---|
| 6,292,098 B1 * | 9/2001 | Ebata et al. | 340/506 |
| 6,353,848 B1 * | 3/2002 | Morris | 709/203 |
| 6,891,566 B2 * | 5/2005 | Marchese | 348/211.3 |
| 2006/0114326 A1 * | 6/2006 | Tanaka | 348/207.11 |
| 2006/0232677 A1 * | 10/2006 | Butaney et al. | 348/207.1 |
| 2012/0026868 A1 * | 2/2012 | Chang et al. | 370/230 |

FOREIGN PATENT DOCUMENTS

| | | |
|---|---|---|
| JP | 2004-289843 A | 10/2004 |
| KR | 10-2004-0034777 A | 4/2004 |
| KR | 10-2006-0023418 A | 3/2006 |
| KR | 10-2006-0081427 A | 7/2006 |

* cited by examiner

*Primary Examiner* — Helen Shibru
(74) *Attorney, Agent, or Firm* — Birch, Stewart, Kolasch & Birch, LLP

(57) ABSTRACT

Disclosed herein is a control method for a Digital Video Recorder (DVR). In the method, a protocol script map table, including command packet information and management information for parsing the command packet information, is newly defined. Whenever a camera using a new protocol is added to the DVR system, a script table for the new protocol is prepared based on the newly defined table, and is copied to a predetermined area of system memory via a data port, such as a Universal Serial Bus (USB) port, and a running main application creates a command packet for controlling the newly connected camera with reference to the prepared script table. Thus, a surveillance camera can be added to a digital video recording system without interrupting a surveillance function.

25 Claims, 12 Drawing Sheets

PRIOR ART

FIG. 2

Packet Format

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| A-Protocol | STX | ID | CMD | CMD | DAT1 | DAT2 | DAT3 | ETX | CS | | | | | | | |
| B-Protocol | ID | STX | OP1 | OP1 | DAT1 | DAT2 | DAT3 | RES | RES | RES | RES | RES | RES | ID | CS | |
| C-Protocol | STX | RES | OP1 | DAT1 | DAT2 | ID | CS | | | | | | | | | |
| D-Protocol | STX | ID | CMD | CMD | DAT1 | DAT2 | DAT3 | ETX | CS | | | | | | | |

PRIOR ART

PRIOR ART

FIG. 4

A-Protocol Header File (A_Protocol.h)

| Byte | B1 | B2 | B3 | B4 | B5 | B6 | B7 | B8 |
|---|---|---|---|---|---|---|---|---|
| Script Header | A-Protocol ||||||||
| Left |  |  | PS |  |  |  | ID | CS |
| Right |  |  | PS |  |  |  | ID | CS |
| Up |  |  |  | TS |  |  | ID | CS |
| Down |  |  |  | TS |  |  | ID | CS |
| Zoom+ |  |  | ZS |  |  |  | ID | CS |
| Zoom- |  |  | ZS |  |  |  | ID | CS |
| Focus+ |  |  |  |  |  |  | ID | CS |
| Focus- |  |  |  |  |  |  | ID | CS |
| Iris+ |  |  |  |  |  |  | ID | CS |
| Iris- |  |  |  |  |  |  | ID | CS |
| Preset |  |  |  |  | PNO | DWELL | ID | CS |
| Move |  |  |  |  | PNO | DWELL | ID | CS |
| Tour |  |  |  |  | PNO | DWELL | ID | CS |
| Pattern Set |  |  |  |  |  |  | ID | CS |
| Pattern Tour |  |  |  |  |  |  | ID | CS |
| Scan Start |  |  |  |  |  |  | ID | CS |
| Scan Stop |  |  |  |  |  |  | ID | CS |
| Scan Tour |  |  |  |  |  |  | ID | CS |

PRIOR ART

B-Protocol Header File (B_Protocol.h)

| Byte | B1 | ... | B6 | B7 | B8 | B9 | B10 | B11 | B12 | B13 | B14 | B15 |
|---|---|---|---|---|---|---|---|---|---|---|---|---|
| Script Header | | | B-Protocol | | | | | | | | | |
| Left | | | | PS | | | | | | | ID | CS |
| Right | | | | PS | | | | | | | ID | CS |
| Up | | | | TS | | | | | | | ID | CS |
| Down | | | | TS | | | | | | | ID | CS |
| Zoom+ | | | | | | | ZS | | | | ID | CS |
| Zoom- | | | | | | | ZS | | | | ID | CS |
| Focus+ | | | | | | | | | | | ID | CS |
| Focus- | | | | | | | | | | | ID | CS |
| Iris+ | | | | | | | | | | | ID | CS |
| Iris- | | | | | | | | | | | ID | CS |
| Preset | | | | | | PNO | | DWELL | | | ID | CS |
| Move | | | | | | PNO | | DWELL | | | ID | CS |
| Tour | | | | | | PNO | | DWELL | | | ID | CS |
| Pattern Set | | | | | | | | | | | ID | CS |
| Pattern Tour | | | | | | | | | | | ID | CS |
| Scan Start | | | | | | | | | | | ID | CS |
| Scan Stop | | | | | | | | | | | ID | CS |
| Scan Tour | | | | | | | | | | | ID | CS |

FIG. 9

Protocol script Map Table

| Byte | B1 | B2 | B3 | ... | B15 | B16 | P1 | P2 | P3 | ... | P7 | P8 |
|---|---|---|---|---|---|---|---|---|---|---|---|---|
| Script Header | | Protocol Name | | | | | | | | | | |
| Left | | | | | | | | | | | | |
| Right | | | | | | | | | | | | |
| Up | | | | | | | | | | | | |
| Down | | | | | | | | | | | | |
| Zoom+ | | | | | | | | | | | | |
| Zoom− | | | | | | | | | | | | |
| Focus+ | | | | | | | | | | | | |
| Focus− | | | | | | | | | | | | |
| Iris+ | | | | | | | | | | | | |
| Iris− | | | | | | | | | | | | |
| Preset | | | | | | | | | | | | |
| Move | | | | | | | | | | | | |
| Tour | | | | | | | | | | | | |
| Pattern Set | | | | | | | | | | | | |
| Pattern Tour | | | | | | | | | | | | |
| Scan Start | | | | | | | | | | | | |
| Scan Stop | | | | | | | | | | | | |
| Scan Tour | | | | | | | | | | | | |

Command Packet Information / Parse Information

FIG. 10

Protocol script Map Table (A-Protocol.txt)

| Byte | B1 | B2 | B3 | B4 | B5 | B6 | B7 | B8 | B9 | B16 | P1 | P2 | P3 | P4 | P5 | P8 |
|---|---|---|---|---|---|---|---|---|---|---|---|---|---|---|---|---|
| Script Header | | | | | A-Protocol | | | | | | | | | | | |
| Left | | | PS | | | | ID | CS | | | 00 | 20 | 00 | 17 | | |
| Right | | | PS | | | | ID | CS | | | 00 | 20 | 00 | 17 | | |
| Up | | | | TS | | | ID | CS | | | 00 | 05 | 00 | 17 | | |
| Down | | | | TS | | | ID | CS | | | 00 | 05 | 00 | 17 | | |
| Zoom+ | | | ZS | | | | ID | CS | | | 00 | 40 | 00 | 17 | | |
| Zoom- | | | ZS | | | | ID | CS | | | 00 | 40 | 00 | 17 | | |
| Focus+ | | | | | | | ID | CS | | | 00 | 00 | 00 | 17 | | |
| Focus- | | | | | | | ID | CS | | | 00 | 00 | 00 | 17 | | |
| Iris+ | | | | | | | ID | CS | | | 00 | 00 | 00 | 17 | | |
| Iris- | | | | | | | ID | CS | | | 00 | 00 | 00 | 17 | | |
| Preset | | | | | PNO | DWELL | ID | CS | | | 00 | 00 | 56 | 17 | | |
| Move | | | | | PNO | DWELL | ID | CS | | | 00 | 00 | 56 | 17 | | |
| Tour | | | | | PNO | DWELL | ID | CS | | | 00 | 00 | 56 | 17 | | |
| Pattern Set | | | | | | | ID | CS | | | 00 | 00 | 00 | 17 | | |
| Pattern Tour | | | | | | | ID | CS | | | 00 | 00 | 00 | 17 | | |
| Scan Start | | | | | | | ID | CS | | | 00 | 00 | 00 | 17 | | |
| Scan Stop | | | | | | | ID | CS | | | 00 | 00 | 00 | 17 | | |
| Scan Tour | | | | | | | ID | CS | | | 00 | 00 | 00 | 17 | | |

FIG. 12

Command Pacekt Information

| B# | Symbol | Value |
|---|---|---|
| L/R SPEED | PS | 1~100 |
| U/D SPEED | TS | 1~100 |
| ZOOM SPEED | ZS | 1~10 |
| PRESET NUMBER | PNO | 1~128 |
| PRESET STOP TIME | DWELL | 1~10 |
| CAMERA ID | ID | 1~16 |
| CHECKSUM RESULT | CS | ### |

Parse Information

| Item | Index |
|---|---|
| NONE | 0x0 |
| ID | 0x1 |
| PAN SPEED | 0x2 |
| TILT SPEED | 0x3 |
| ZOOM SPEED | 0x4 |
| PRESET NUMBER | 0x5 |
| PRESET DWELL TIME | 0x6 |
| CHECKSUM | 0x7 |

FIG. 13

Protocol script Map Table (B-Protocol.txt)

| Byte | B1 | B7 | B8 | B9 | B10 | B11 | B12 | B13 | B14 | B15 | B16 | P1 | P4 | P5 | P6 | P7 | P8 |
|---|---|---|---|---|---|---|---|---|---|---|---|---|---|---|---|---|---|
| Script Header | | | | | B-Protocol | | | | | | | | | | | | |
| Left | | PS | | | | | | | ID | CS | | 00 | 20 | 00 | 00 | 01 | 70 |
| Right | | PS | | | | | | | ID | CS | | 00 | 20 | 00 | 00 | 01 | 70 |
| Up | | TS | | | | | | | ID | CS | | 00 | 30 | 00 | 00 | 01 | 70 |
| Down | | TS | | | | | | | ID | CS | | 00 | 30 | 00 | 00 | 01 | 70 |
| Zoom+ | | | | | ZS | | | | ID | CS | | 00 | 00 | 04 | 00 | 01 | 70 |
| Zoom- | | | | | ZS | | | | ID | CS | | 00 | 00 | 04 | 00 | 01 | 70 |
| Focus+ | | | | | | | | | ID | CS | | 00 | 00 | 00 | 00 | 01 | 70 |
| Focus- | | | | | | | | | ID | CS | | 00 | 00 | 00 | 00 | 01 | 70 |
| Iris+ | | | | | | | | | ID | CS | | 00 | 00 | 00 | 00 | 01 | 70 |
| Iris- | | | | | | | | | ID | CS | | 00 | 00 | 00 | 00 | 01 | 70 |
| Preset | | | | PNO | | | DWELL | | ID | CS | | 00 | 00 | 50 | 06 | 01 | 70 |
| Move | | | | PNO | | | DWELL | | ID | CS | | 00 | 00 | 50 | 06 | 01 | 70 |
| Tour | | | | PNO | | | DWELL | | ID | CS | | 00 | 00 | 50 | 06 | 01 | 70 |
| Pattern Set | | | | | | | | | ID | CS | | 00 | 00 | 00 | 00 | 01 | 70 |
| Pattern Tour | | | | | | | | | ID | CS | | 00 | 00 | 00 | 00 | 01 | 70 |
| Scan Start | | | | | | | | | ID | CS | | 00 | 00 | 00 | 00 | 01 | 70 |
| Scan Stop | | | | | | | | | ID | CS | | 00 | 00 | 00 | 00 | 01 | 70 |
| Scan Tour | | | | | | | | | ID | CS | | 00 | 00 | 00 | 00 | 01 | 70 |

DIGITAL VIDEO RECORDER AND CONTROL METHOD THEREFOR

BACKGROUND OF THE INVENTION

1. Field of the Invention

The present invention relates generally to a digital video recorder and, more particularly, to a method of adding a camera using a new protocol to a digital video recording system without interrupting a surveillance function.

2. Description of the Related Art

Recently, as Digital Video Recorders (DVRs) are becoming popular, a plurality of surveillance cameras are installed in an area where security is required, captures surveillance images, and transmits the captured image data to a DVR, which is at a remote location relative to the cameras, for recording in the DVR.

Furthermore, a recent surveillance camera includes a lens having a zoom function, so that it can magnify and photograph a distant object (tele-photographing) or can photograph a plurality of subject objects at one time (wide-angle photographing). Furthermore, the surveillance camera is mounted on a pan/tilter for rotating the camera in horizontal and vertical directions, so that it can photograph all portions of the area in which the surveillance camera is installed at various angles. The surveillance camera provided with such panning, tilting, and zoom functions is called a 'Pan/Tilt/Zoom (PTZ) camera.'

FIG. 1 is a diagram showing an example of a connection between a plurality of PTZ cameras $100_1$ to $100_k$ and a DVR 200.

Images captured using the plurality of PTZ cameras $100_1$ to $100_k$ are transmitted to the DVR 200, which is at a remote location relative to the PTZ cameras, and are output to the monitor of the DVR or recorded on a storage medium.

Furthermore, the lateral and vertical rotation operations and zooming operations of each of the PTZ cameras $100_1$ to $100_k$ are controlled in response to commands input by the operator of the DVR 200. In this case, control messages that correspond to the commands are transmitted to a corresponding camera. Cameras manufactured by different manufacturers may be used as the plurality of PTZ camera $100_1$ to $100_k$. In this case, the communication protocols differ according to respective manufacturers, so that different control messages must be used in accordance with respective targeted cameras to be controlled.

For example, as shown in FIG. 2, respective PTZ cameras manufactured by manufacturers A to D use intrinsic protocols (for example: A-protocol, B-protocol, C-protocol, D-protocol), messages, that is, packet data formats, each of which contains control commands, differ according to the respective protocols.

Generally, a main application, which is a file to be executed in a processor, is created by compiling and linking a source file, which is written in C language or the like, with the protocol header files of respective cameras.

That is, as shown in FIG. 3, an engineer who develops a DVR compiles and links an A-protocol header file 'A_Protocol.h' and a B-protocol header file 'B_Protocol.h' with a source file 'Main_PTZ_Control.c', and thus the main application, which is a program for performing the capturing and recording of a surveillance image and a camera control operation, is created.

FIGS. 4 and 5 are diagrams showing an A-protocol header file 'A_Protocol.h,' which is suitable for a protocol for a PTZ camera manufactured by manufacturer A, and a B-protocol header file 'B_Protocol.h,' which is suitable for a protocol for a PZT camera manufactured by manufacturer B, respectively. In the example of FIG. 4, the cameras of manufacturer A are controlled using an 8-byte command packet. In the example of FIG. 5, the cameras of manufacturer B are controlled using a 15-byte command packet.

However, when it is desired to add a PTZ camera using a new protocol to a DVR system, the DVR development engineer must interrupt the main application, which is a currently running program, updates the main application so as to include a header file for the new protocol as described above with reference to FIG. 3, and reboot the system to apply the updated main application thereto. In this case, a problem occurs in that the surveillance function is interrupted.

SUMMARY OF THE INVENTION

Accordingly, the present invention has been made keeping in mind the above problems occurring in the prior art, and an object of the present invention is to provide a method of adding a surveillance camera to a DVR system without interrupting a surveillance function.

In order to accomplish the above object, the present invention provides a control method for a digital video recorder, including the steps of storing a file for creating a control packet for a surveillance camera using an intrinsic communication protocol, the file including control packet information and parsed information for parsing the control packet information; and creating the control packet based on the control packet information with reference to the parsed information.

In addition, the present invention provides a digital video recorder, including a storage unit for storing a file for creating a control packet for a surveillance camera that uses an intrinsic communication protocol, the file including control packet information and parsed information for parsing the control packet information; and a control unit for creating the control packet based on the control packet information with reference to the parsed information.

The file is an uncompressed text file, and may be separately stored for a camera that uses a unique communication protocol. Furthermore, the file is stored in the system memory of the digital video recorder, and is stored in an area different from an area in which an executable program related to capture of a surveillance image is stored, and may be transmitted from a memory card connected via a data port, or is transmitted online, while the executable program is running. The executable program is created without using the file for creating the control packet.

Furthermore, the parsed information describes locations which varying values are to occupy in the control packet and the details of the varying values. Furthermore, of bytes constituting the control packet, a byte in which any of a panning speed, a tilting speed, a zoom speed, a preset number, a stoppage period, a camera address and a checksum result is recorded has the varying value. In the control packet information, a maximum varying value or a method of creating a varying value is recorded in a byte having the varying value. The method of creating the varying value is information indicating any of types that create a checksum result for the control packet.

Furthermore, the control packet information has a first width, in which all bytes of the control packet for various communication protocols are accommodated, and a first length, in which all control entries that will be used to perform control operations via the control packet are accommodated, and the parsed information may have a second width smaller than the first width and a second length identical to the first length.

Furthermore, in the control packet information, each of bytes subsequent to a number of bytes corresponding to the length of the control packet used for the corresponding protocol has a value of '0x0,' and pieces of information for respective control entries may be listed in a direction in which rows proceed in a predetermined order.

Furthermore, the second width may be half of the first width, and the nibbles of the parsed information may sequentially correspond to the respective bytes of the control packet information. In this case, the information indicating the details of the varying values is recorded in the nibbles, corresponding to bytes which the varying values can enter in the control packet information, of the parsed information, and a value '0x0' is recorded in each of the nibbles of the parsed information corresponding to bytes having a fixed value, rather than varying values, in the control packet information.

BRIEF DESCRIPTION OF THE DRAWINGS

The above and other objects, features and advantages of the present invention will be more clearly understood from the following detailed description taken in conjunction with the accompanying drawings, in which:

FIG. 2 is a diagram showing an example of command packet formats depending on respective communication protocols for the PTZ cameras;

FIGS. 4 and 5 are diagrams showing examples of typical protocol header files;

FIG. 6 is a block diagram showing the construction of a DVR to which the present invention is applied;

FIG. 9 is a diagram showing an embodiment of a protocol script map table according to the present invention;

FIG. 10 is a diagram showing an example of a text file including the protocol script map table of manufacturer A;

FIG. 12 is a diagram showing a table in which the details of each of bytes having respective varying values, and the ranges of respective varying values are given in the command packet information of the protocol script map table, and a table in which the details of the varying values and intrinsic codes are given in the parsed information of the protocol script map table;

FIG. 13 is a diagram showing an example of a text file including the protocol script map table of manufacturer B.

DETAILED DESCRIPTION OF PREFERRED EMBODIMENTS

Preferred embodiments of the present invention are described in detail with reference to the accompanying drawings below.

In the present invention, when a camera using a new protocol is connected, only the protocol for the newly connected camera is added to a DVR system while the DVR system runs continuously, so that the operation of the main application is not interrupted. For this purpose, the structure of system memory for implementing this scheme, descriptions of a command packet for controlling the camera to be added, that is, the structure of the protocol script, and the method of implementing this scheme in a DVR are provided.

A protocol script map table, including command packet information and management information for parsing the command packet information, is newly defined. Whenever a camera using a new protocol is added to the DVR system, a script table for the new protocol is prepared based on the newly defined table, and is copied to a predetermined area of system memory via a data port, such as a Universal Serial Bus (USB) port, and a running main application creates a command packet for controlling the newly connected camera with reference to the prepared script table.

Figure 1:
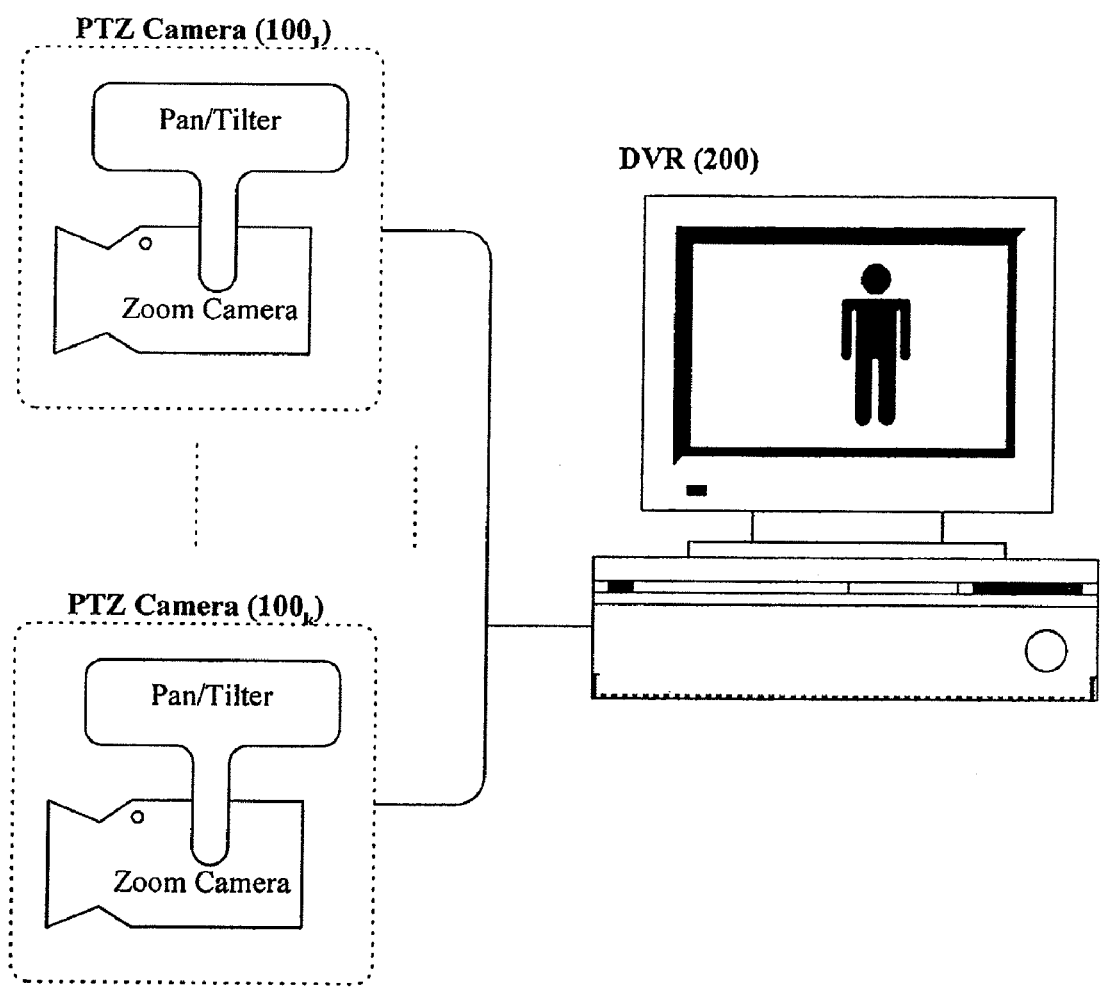
FIG. 1 is a diagram showing an example of a connection between a plurality of PTZ cameras and a digital video recorder.
Figure 3:
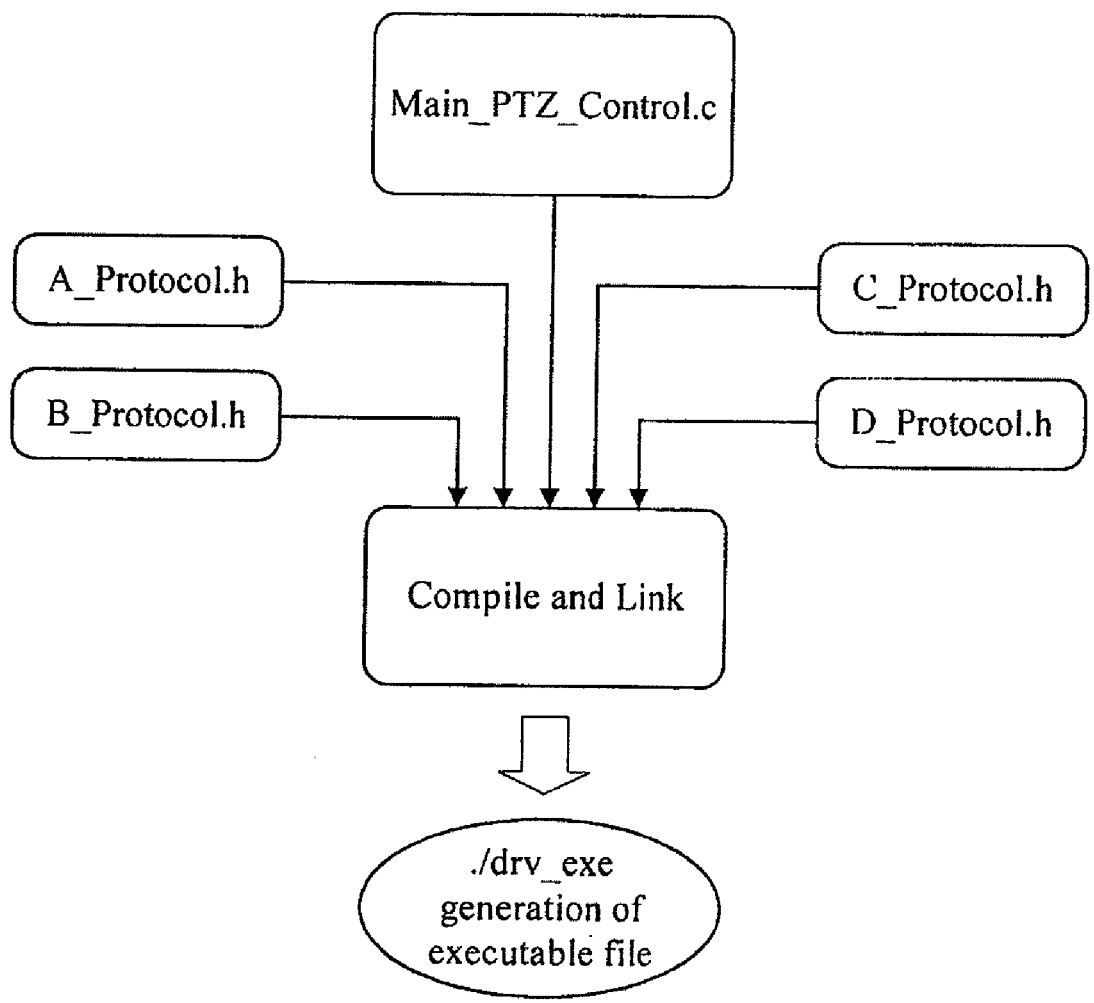
FIG. 3 is a diagram showing an example of the generation of a main application, that is, an executable file, by compiling a source file and header files together in a typical digital video recorder.
Figures 5, 6:
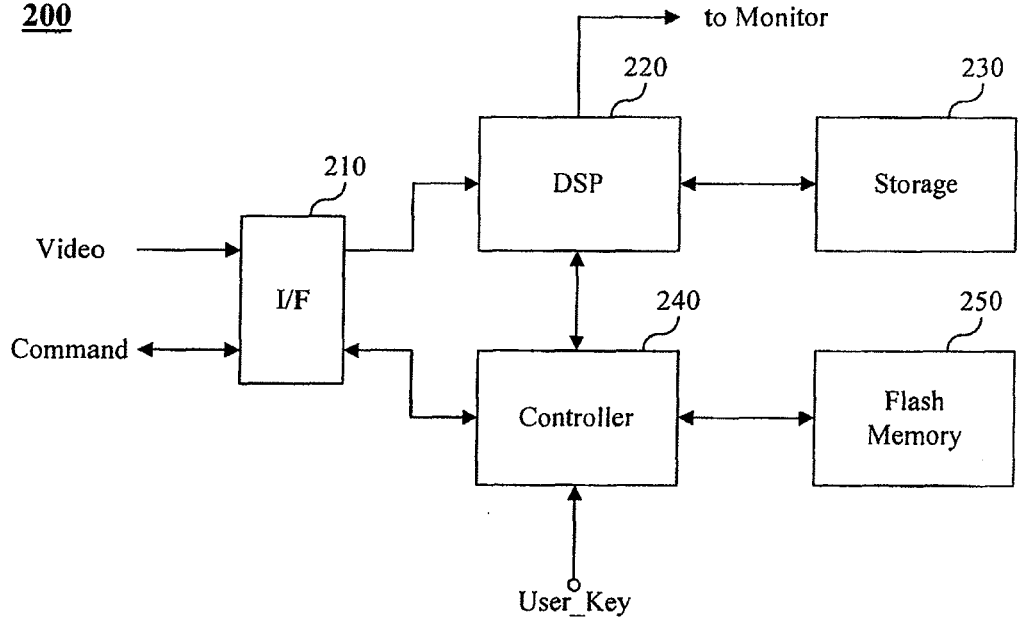

FIG. 6 is a block diagram showing the construction of a DVR to which the present invention is applied. The DVR includes an interface unit 210 connected to PZT cameras, a digital signal processing unit 220 for outputting surveillance images transmitted from the cameras to a monitor or performing conversion on the surveillance images to record the surveillance images on a medium, a storage unit 230, such as a Hard Disk Drive (HDD), for storing the surveillance images, a control unit 240, such as a Central Processing Unit (CPU), for executing a main application, flash memory 250, that is, nonvolatile memory, for storing a kernel, a main application and PTZ protocol script.

When the system is booted, a kernel image and a main application image, which are stored in the flash memory 250, are decompressed and are loaded onto the control unit 240. In this case, the control unit 240 controls the operation of the DVR by executing the main application.

Figure 7:
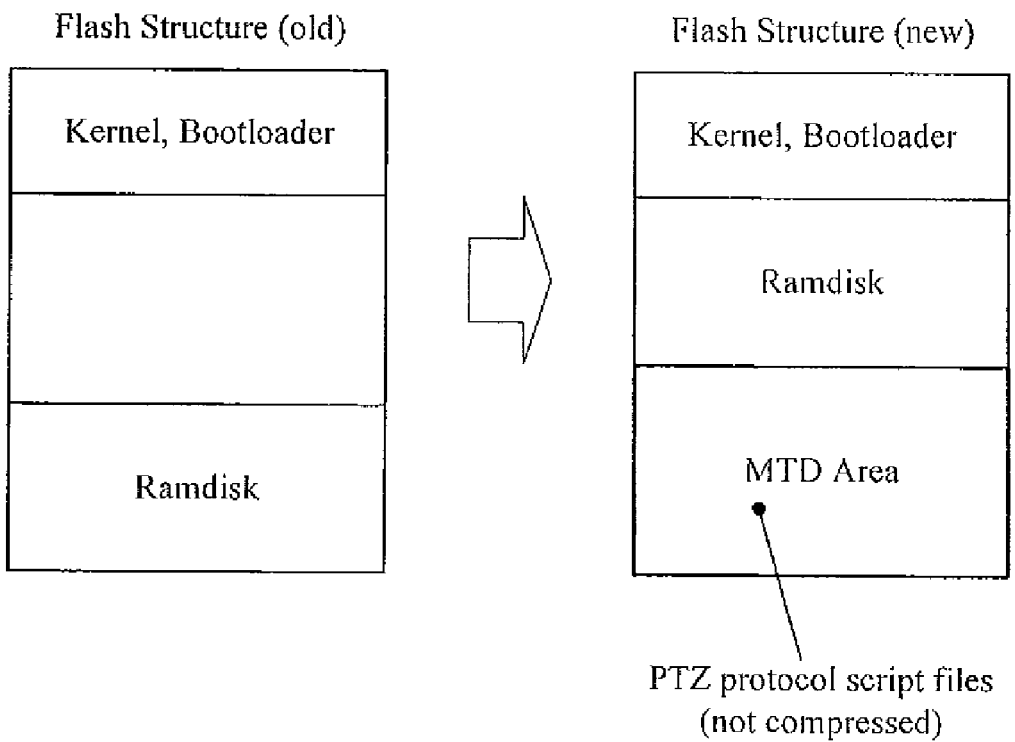
FIG. 7 is a diagram showing an embodiment in which a PTZ protocol script file is stored in a specific area of flash memory, according to the present invention.

The flash memory of a conventional digital video recorder, as shown in FIG. 7, has a structure in which a kernel area for storing a kernel image and a bootloader image is assigned to the front portion thereof, and a ramdisk area for storing a main application image is assigned to the end portion thereof.

In contrast, the flash memory 250 according to the present invention has a structure in which a kernel area for storing a kernel image and a bootloader image is assigned to the front portion thereof, and a ramdisk area for storing a main application image is assigned to the intermediate portion thereof, and a Map Table Data (MTD) area is assigned to the end portion thereof. In this case, the PTZ protocol script files are independently stored in the MTD area that is different from the kernel area and the ramdisk area.

Each of the PTZ protocol script files is an uncompressed text file, and includes command packet information for controlling a PTZ camera using an intrinsic communication protocol, and parsed information, which is information describing command packets, in the form of a table.

Figure 8:
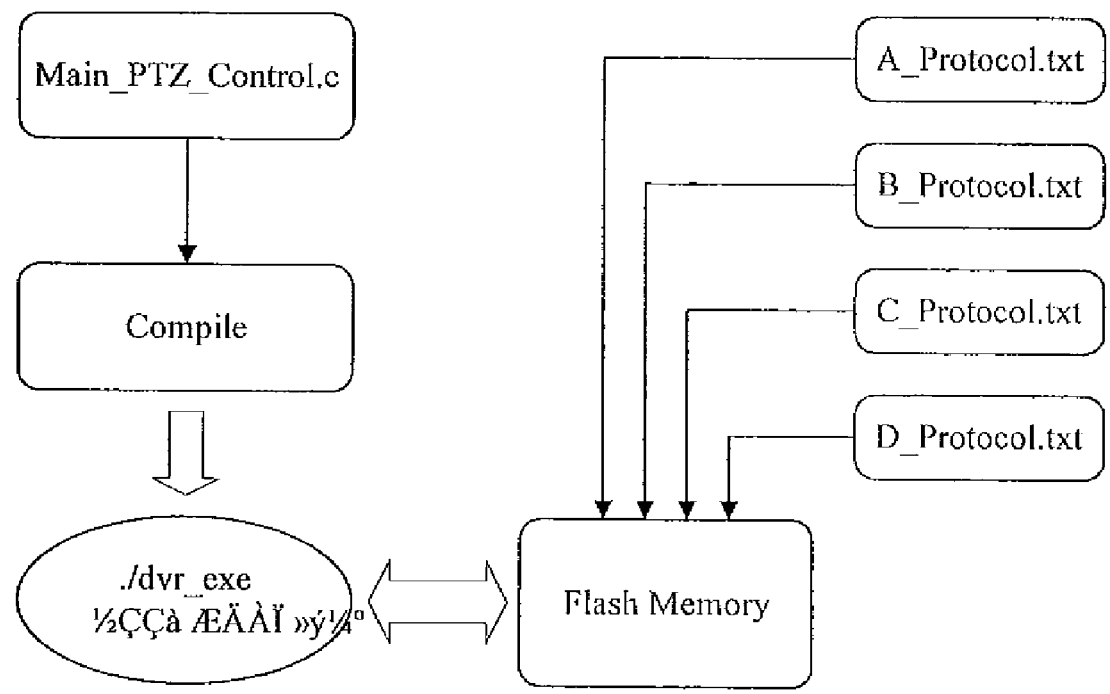
FIG. 8 is a diagram showing an embodiment in which a source file is compiled independently of header files in the DVR to which the present invention is applied and, thus, a main application, that is, an executable file, is created.

As shown in FIG. 8, the protocol text files 'A_Protocol.txt,' 'B_Protocol.txt,' 'C_Protocol.txt' and 'D_Protocol.txt,' which correspond to the PTZ protocol script files, are managed in the flash memory 250, without requiring that the main application, which is an executable file to be executed in the control unit 240, be compiled.

Furthermore, as shown in FIG. 9, the protocol script map table according to the present invention includes, for example, command packet information, which indicates a command packet structure, and parsed information, which is management information for parsing the command packet information.

The length of a command packet differs according to the respective protocols of manufacturers, so that the maximum length of the command packet is set to 16 bytes, which is sufficient. The protocol script map table can be constructed by adding 8-byte parsed information, which describes locations which varying values are to occupy in the command packet and details of the varying values.

Furthermore, the protocol script map table includes command packet information for a plurality of control entries, which are used to perform control via command packets, and parsed information for the command packet. In the table of FIG. 9, 19 control entries, which are used to perform control via the command packet, are listed in a column direction.

The control entries may include Left/Right for controlling a pan operation, Up/Down for controlling a tilt operation, Zoom+/Zoom− for controlling a zoom operation, Focus+/Focus− for controlling a focus operation, Iris+/Iris− for controlling an iris, Preset for performing control to enter a predetermined pan/tilt/zoom state, Move for controlling a preset movement operation, Tour for controlling a preset tour operation, Pattern Set for setting a preset pattern, Pattern Tour for touring according to a preset pattern, Scan Start for controlling a scan start operation, Scan Stop for controlling a scan stoppage operation, and Scan Tour for controlling a scan tour operation. The control entries are constructed so as to accommodate all commands used in various types of PTZ cameras.

The protocol script map table of FIG. 9 is constructed to have a size of 19×24 bytes (19 control entries and (16-+8)-byte command packet information and parsed information). As needed, a new control entry may be added to the protocol script map table.

When the length of the command packet is increased, communication efficiency is lowered, and thus the probability of use of a command packet longer than a 16-byte command packet is low. Accordingly, a new control entry is added while only the number of rows is increased without changing the structure of the table (chiefly, the number of columns), and thus the size of the protocol script map table becomes n×24 bytes.

FIG. 10 is a diagram showing an example of a text file 'A_Protocol.txt' including the protocol script map table of manufacturer A.

Packet data for control entries is recorded in the command packet information of the protocol script map table, and a value '0x0' is recorded in each of bytes, which are subsequent to a number of bytes corresponding to the length of the control packet used for the protocol of the corresponding manufacturer among 16 bytes. In the example of FIG. 10, an A-protocol uses a command packet having a length of 8 bytes, so that command packet data is recorded in bytes B1 to B8 to perform a control operation for each entry, and the value '0x0' is recorded in each of bytes B9 to B16.

For example, an 8-byte command packet for a left pan command 'Left' includes information indicating that a corresponding command is the left pan command, information ID indicating that a corresponding command is for a particular camera, information CS about a checksum result, and information about a panning speed PS or an angle.

Accordingly, in the command packet information of the control entry 'Left' of FIG. 10, the bytes B1 to B8 include left command packet data having the above-described information, and each of the bytes B9 to B16 includes the value '0x0.' In this case, for information the value of which can be changed, like panning speed or angle information, the maximum value that corresponding information can have may be recorded in a byte (B3 in the example of FIG. 10) in which the corresponding information is located in the command packet information of the protocol script map table.

In the same manner, an 8-byte command packet for a right pan command 'Right' includes information indicating that a corresponding command is the right pan command, information ID indicating that a corresponding command is for a particular camera, information CS about a checksum result, and information about a panning speed. Accordingly, in the command packet information of the control entry 'Right' of FIG. 10, the bytes B to B8 include right command packet data having the above-described information. The maximum value of a panning speed is recorded in the byte B3, which is one of the bytes B1 to B8.

In the example of FIG. 10, the maximum value of a tilting speed TS is recorded in the byte B4 of the command packet information for the control entry 'Up' or 'Down,' and the maximum value of a zoom speed ZS is recorded in the byte 83 of the command packet information of the control entry 'Zoom+' or 'Zoom−.' Furthermore, in the command packet information for the control entries 'Preset,' 'Move' and 'Tour,' related to the predetermined pan/tilt/zoom state, the maximum number of presets PNO and the maximum stoppage period DWELL are recorded in the Bytes B5 and B6, respectively.

Furthermore, in the example of FIG. 10, the information ID, indicating that a corresponding command is for a particular camera, is located in the 7th byte of the command packet. Accordingly, the maximum number of cameras to be managed is recorded in the byte B7 of the command packet information for each control entry.

The information CS about a checksum result is located in the 8th byte of the command packet, and the checksum result is not a predetermined value. Accordingly, information indicating a method of performing checksum, for example a Sum operation, an OR operation, an XOR operation and a SUM+128 Modulo operation may be recorded in the byte B8 of the command packet information for each control entry.

In the command packet information of FIG. 10, only bytes having respective varying values are represented by symbols, such as PS, TS, ZS, ID, CS, PNO and DWELL, and a fixed value for constituting a command packet for a corresponding control entry is recorded in each of the remaining bytes, but not a value '0x0' or an insignificant value. Here, it should be noted that the value '0x0' is recorded in each of bytes which are subsequent to a position corresponding to the length (8 bytes) of a command packet used for a corresponding protocol, that is, in each of the bytes B9 to B16 of FIG. 10.

When the main application, which is executed in the control unit 240, reads the command packet information of the protocol script map table and creates command packets for respective control entries based on the read command packet information, it is necessary to check that each row contains information corresponding to which control packet, which bytes have a varying value in a command packet for each control entry, or the varying value is about what (for example, a value indicating the panning speed PS, camera identifier ID or check sum result (or check sum method) CS for the control entry 'Left').

First, the control entries are listed in the protocol script map table in a predetermined order, so that it can be checked that each row corresponds to which control entry. As shown in FIG. 9 and FIG. 10, the respective control entries are in a predetermined order, that is, in the order of Left-> Right->Up-> . . . ->Scan Tour, in the direction in which rows proceed, and thus the map table can be constructed.

Furthermore, the parsed information for parsing the command packet information is added to the command packet information having a predetermined length (for example, 16 bytes), and thus information associated with the varying values of the command packet information, that is, the locations of respective bytes having varying values and the details thereof, can be checked.

Figure 11:
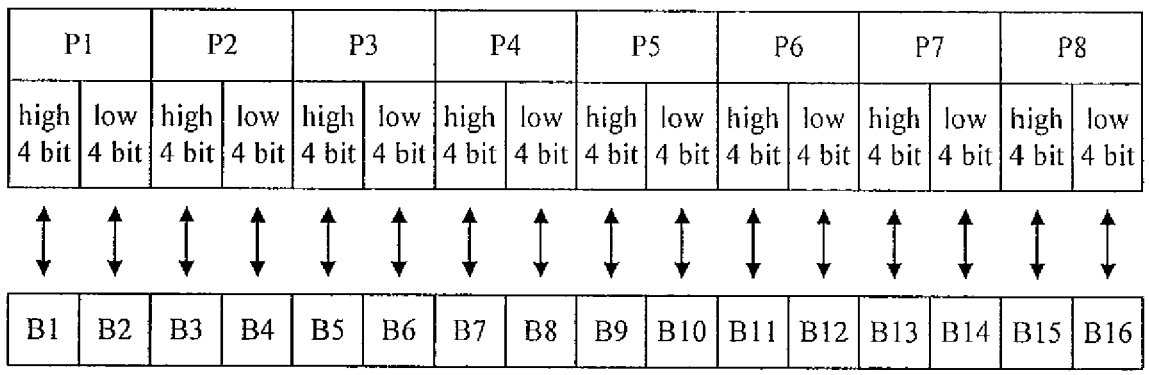
FIG. 11 is a diagram showing an embodiment in which command packet information and parsed information correspond to each other according to the present invention.

FIG. 11 shows a correlation between the parsed information and the command packet information. In the examples of FIG. 9 and FIG. 10, 8 bytes are assigned to the parsed information, thus corresponding to half of the command packet information having a size of 16 bytes. That is, the 4 bits of a single byte constituting the parsed information, that is, a nibble, sequentially correspond to a single byte constituting the command packet information.

As shown FIG. 11, the first 4 bits (high 4 bits) of the first byte P1 of the parsed information, that is, the first nibble, correspond to the first byte B1 of the command packet information. In the same manner, the second 4 bits (low 4 bits) of the first byte P1 of the parsed information, that is, the second nibble, correspond to the second byte of the command packet information.

In a nibble, corresponding to the byte having a varying value in the command packet information, of the parsed information, information indicating the type (PS, TS, ZS, ID or CS) of the varying value of the corresponding byte, that is, information indicating the details of the varying value, is recorded. The value '0x0' is recorded in each of the nibbles of the parsed information, which correspond to bytes having a fixed value in the command packet information.

A panning speed PS, a tilting speed TS, a zoom speed ZS, a preset number PNO, a stoppage period DWELL, a camera identifier ID and a checksum result CS have respective varying values, and correspond to respective index numbers as shown in FIG. 12. For example, the camera address corresponds to 0x1, the panning speed corresponds to 0x2, the tilting speed corresponds to 0x3, the zoom speed corresponds to 0x4, the preset number corresponds to 0x5, the stoppage period 0x6, and the checksum result corresponds to 0x7. Accordingly, an index number for the details of a varying value is recorded in a nibble of parsed information, which corresponds to the byte having the varying value in the command packet information.

In the lower table of FIG. 12, the correspondence relationship between the details of each of bytes, having respective varying values, and index numbers are shown with respect to data to be recorded in the nibble of the parsed information, and, in the upper table of FIG. 12, the correspondence relationship between the details of each of bytes, having respective varying values, and the ranges of the respective values are shown with respect to data to be recorded in the command packet information. In the command packet information of the protocol script map table, the maximum value that is permitted by the details of each of bytes having respective varying values (from which a byte having a checksum result is excluded) may be recorded in the byte.

In the command packet for the 'Left' control entry, shown in FIG. 10, a panning speed PS, a camera ID, and a checksum result CS having respective varying values are recorded in the third byte, the seventh byte and the eighth byte, respectively.

Accordingly, in the command packet information of the protocol script map table, the maximum value of the panning speed PS and the maximum value of the camera identifier ID are recorded in the bytes B3 and B7 (the type of checksum result CS may be recorded in the byte B8), and, in the parsed information, intrinsic number 2, 1 and 7, corresponding to the panning speed PS, the camera identifier ID and the checksum result CS, are recorded in the first nibble of P2, and the first and second nibbles of P4, corresponding to bytes B3, B7 and B8 respectively. Here, it should be noted that, in the command packet information of the protocol script map table, the fixed value for constituting the command packet for the 'Left' control entry is recorded in each of the bytes B1, B2, B3, B5 and B6, and the value '0x0' is recorded in each of the bytes B9 to B16. In the parsed information, the value '0x0' is recorded in other nibbles.

Furthermore, in the command packet information For the 'Up' (or 'Down') control entry, the tilting speed TS and the maximum value of the camera identifier ID are recorded in the respective bytes B4 and B7 (the type of checksum result CS may be recorded in the byte B8), and, in the parsed information, index numbers 5, 1 and 7, corresponding to the tilting speed TS, the camera identifier TD and the checksum result CS, are recorded in the first and second nibbles of P4 and the second nibble of P2, respectively.

Furthermore, in the command packet information for the 'Zoom+' (or 'Zoom-') control entry, the zoom speed ZS and the maximum number of the camera identifier ID are recorded in the respective bytes B3 and B7 (the type of checksum result CS may be recorded in the byte BE), and, in the parsed information, index numbers 4, 1 and 7, corresponding to the zoom speed ZS, the camera identifier ID and the checksum result CS, are recorded in the first and second nibbles of P4 and the second nibble of P2, respectively.

Furthermore, in the command packet information for the 'Preset' (or 'Move' or 'Tour') control entry, the preset number PNO, the stoppage period DWELL and the maximum number of the camera identifier ID are recorded in the respective bytes B5, B6 and B7 (the type of checksum result CS may be recorded in the byte B8), and, in the parsed information, index numbers 5, 6, 1 and 7, corresponding to the packet number PNO, the stoppage period DWELL, the camera identifier ID and the checksum result CS, are recorded in the first and second nibbles of P3 and the first and second nibbles of P4, respectively.

FIG. 13 is a diagram showing an example of a text file 'A_Protocol.txt' including the protocol script map table of manufacturer B. In a B-protocol, a command packet is constructed using 15 bytes, so that a fixed value constituting a command packet for a corresponding control entry is recorded in each of the bytes B1 to B15 (from which bytes having respective varying values are excluded), and the maximum value of panning speed PS and the maximum value of the camera identifier ID, the maximum value of the tilting speed TS, the maximum value for the preset number PNO, the maximum value of the stoppage period DWELL and the maximum value of the camera identifier ID, or the type of checksum result CS, are recorded in the bytes B7, B9 and B9, having the respective varying values. Furthermore, in the parsed information, index numbers corresponding to the panning speed, the tilting speed, the zoom speed, the preset number PNO, the stoppage period DWELL, the camera identifier ID and the type of checksum result CS are recorded in nibbles corresponding to the bytes having the respective varying values.

The embodiments of the protocol script map table of FIG. 10 and FIG. 13 are only examples for description, but the present invention is not limited thereto.

Figure 14:
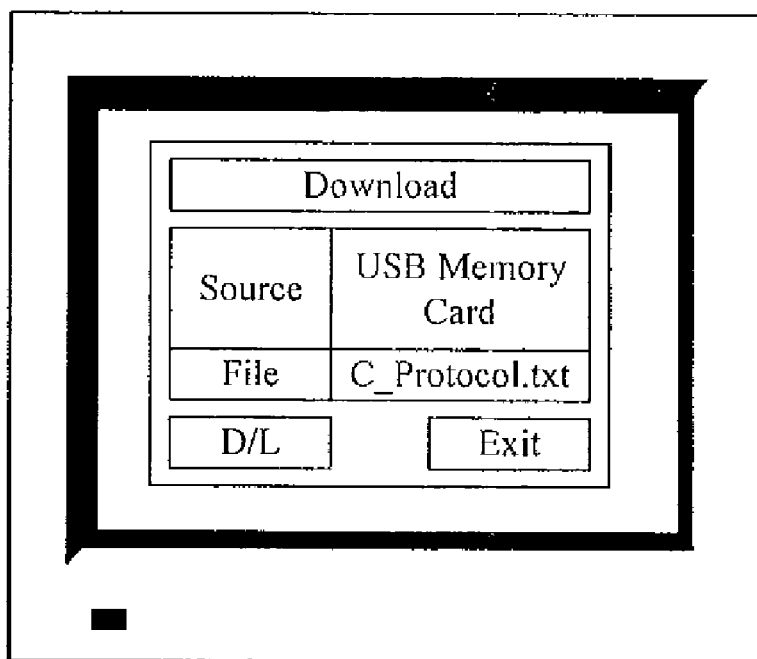
FIG. 14 is a diagram showing an embodiment for downloading a protocol text file to the DVR.
Figure 14:
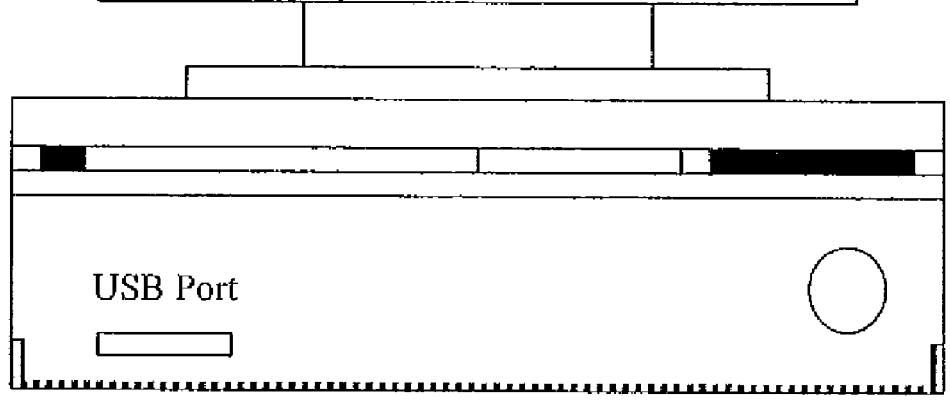
Figure 14:
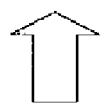
Figure 14:

Meanwhile, the protocol text files, described above, are stored in the flash memory 250 using various types of download methods. As shown in FIG. 14, a protocol text file, which is stored in a USB memory card connected to the DVR 200, may be downloaded to the flash memory 250 using a User Interface (UI) menu screen, or may be download online using a communication network, such the Internet. The protocol text file is stored in the MTD area of the flash memory 250.

That is, when a user makes a request for a protocol text file download operation through a main screen to control a new PZT camera while a typical recording operation of recording surveillance images in the storage unit 230 is being performed, the main application executed in the control unit 240 performs a download operation of copying a new protocol text files, stored in the USB memory card or the like, to the MTD area of the flash memory 250.

Furthermore, the main application searches for a protocol text file for a camera desired to be controlled among protocol text files for respective cameras, which are stored in the flash memory 250, parses command packet information with reference to the parsed information of the found file, creates a command packet, which can be detected by the PZT camera desired to bed controlled, and transmits the created command packet. In this case, the command packet is created to have a length necessary to actual control.

The command packet information and the parsed information are recorded in the protocol text file in the form of a table, and information for each control entry is recorded in a predetermined order in a direction in which rows proceed. Accordingly, the main application can acquire information for a desired control entry from a corresponding row.

Furthermore, the main application checks the locations of bytes in the command packet information, in which a value of '0x0' is repeated, and thus can check the length of a corresponding protocol command packet. Furthermore, the main application checks the locations of respective bytes having varying values and the details thereof in the command packet from the parsed information, and thus can check the maximum value of a varying range or the type of checksum result in the location of a corresponding byte of the command packet information.

Accordingly, the main application reads command packet information having the checked length from a row corresponding to a control entry desired to be controlled, and creates and transmits a command packet for the entry desired to be controlled while varying values in the respective locations of the checked bytes of the read data (for example, the panning speed (B3), the camera address (B7) and the checksum result (B8) in the 'Left' control entry of FIG. 10).

In this case, the PZT camera receives only a command protocol appropriate for its protocol among command packets received through a control line, and performs control operations in accordance with the details of the received command packet.

Accordingly, a surveillance camera can be added to a digital video recording system without interrupting a surveillance function.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A control method for a digital video recorder, comprising the steps of:
storing, by the digital video recorder, a file for creating a control packet for a surveillance camera using an intrinsic communication protocol, the file including control packet information and parsed information for parsing the control packet information; and
creating the control packet based on the control packet information with reference to the parsed information,
wherein the parsed information describes locations in which varying values are to occupy in the control packet and details of the varying values,
wherein the control packet information has a first width in which all bytes of control packets for various communication protocols are accommodated, and a first length in which all control entries that will be used to perform control operations via the control packet are accommodated, and
wherein the parsed information has a second width equal to or smaller than the first width and a second length identical to the first length.

2. The control method as set forth in claim 1, wherein the file is an uncompressed text file.

3. The control method as set forth in claim 1, wherein the file is separately stored for a camera that uses a unique communication protocol.

4. The control method as set forth in claim 1, wherein the file is stored in system memory of the digital video recorder, and is stored in an area different from an area in which an executable program related to capture of a surveillance image is stored.

5. The control method as set forth in claim 4, wherein the executable program is created without using the file for creating the control packet.

6. The control method as set forth in claim 4, wherein the file is transmitted from a memory card connected via a data port, or is transmitted online, while the executable program is running.

7. The control method as set forth in claim 1, wherein each of bytes subsequent to a number of bytes corresponding to a length of the control packet used for a corresponding communication protocol has a value of '0x0' in the control packet information.

8. The control method as set forth in claim 7, wherein nibbles of the parsed information sequentially correspond to respective bytes of the control packet information.

9. The control method as set forth in claim 8, wherein information indicating the details of the varying values is recorded in nibbles of the parsed information corresponding to bytes of the control packet information having the varying values, and a value '0x0' is recorded in nibbles of the parsed information corresponding to bytes of the control packet information having fixed values, rather than varying values.

10. The control method as set forth in claim 1, wherein pieces of information for respective control entries are listed in a direction in which rows proceed in a predetermined order.

11. The control method as set forth in claim 1, wherein the second width is half of the first width.

12. The control method as set forth in claim 1, wherein, the bytes of the control packet include a byte configured to record any of a panning speed, a tilting speed, a zoom speed, a preset number, a stoppage period, a camera address and a checksum result, and wherein the byte which is configured to record has a varying value.

13. The control method as set forth in claim 1, wherein, in the control packet information, a maximum varying value or a method of creating a varying value is recorded in a byte having a varying value.

14. The control method as set forth in claim 13, wherein the method of creating the varying value is information indicating any of types that create a checksum result for the control packet.

15. A digital video recorder, comprising:
a storage unit configured to store a file for creating a control packet for a surveillance camera that uses an intrinsic communication protocol, the file including control packet information and parsed information for parsing the control packet information; and
a control unit configured to create the control packet based on the control packet information with reference to the parsed information,
wherein the parsed information describes locations which varying values are to occupy in the control packet and details of the varying values,
wherein the control packet information has a first width in which all bytes of control packets for various communication protocols are accommodated, and a first length in which all control entries that will be used to perform control operations via the control packet are accommodated, and
wherein the parsed information has a second width equal to or smaller than the first width, and a second length identical to the first length.

16. The digital video recorder as set forth in claim 15, wherein the file is an uncompressed text file, and is separately stored for a camera that uses a unique communication protocol.

17. The digital video recorder as set forth in claim 15, wherein the file is stored in an area different from an area in which an executable program related to capture of a surveillance image is stored, the executable program being created without using the file for creating the control packet.

18. The digital video recorder as set forth in claim 17, wherein the file is transmitted from a memory card connected via a data port, or is transmitted online while the executable program is running.

19. The digital video recorder as set forth in claim 15, wherein each of bytes subsequent to a number of bytes corresponding to a length of the control packet used for a corresponding communication protocol has a value of '0×0' in the control packet information.

20. The digital video recorder as set forth in claim 15, wherein pieces of information for respective control entries are listed in a direction in which rows proceed in a predetermined order.

21. The digital video recorder as set forth in claim 15, wherein the second width is half of the first width, and
nibbles of the parsed information sequentially correspond to respective bytes of the control packet information.

22. The digital video recorder as set forth in claim 21, wherein information indicating the details of the varying values is recorded in nibbles of the parsed information corresponding to bytes of the control packet information having the varying values, and a value '0×0' is recorded in nibbles of the parsed information corresponding to bytes of the control packet information having fixed values, rather than varying values.

23. The digital video recorder as set forth in claim 15, wherein the bytes of the control packet include a byte configured to record any of a panning speed, a tilting speed, a zoom speed, a preset number, a stoppage period, a camera address and a checksum result, and wherein the byte which is configured to record has a varying value.

24. The digital video recorder as set forth in claim 15, wherein, in the control packet information, a maximum varying value or a method of creating a varying value is recorded in a byte having a varying value.

25. The digital video recorder as set forth in claim 24, wherein the method of creating the varying value is information indicating any of types that creates a checksum result for the control packet.

* * * * *